(12) United States Patent
Miwa et al.

(10) Patent No.: US 7,244,284 B2
(45) Date of Patent: Jul. 17, 2007

(54) HONEYCOMB FILTER

(75) Inventors: Shinichi Miwa, Tajimi (JP); Yukio Miyairi, Nagoya (JP); Shigeharu Hashimoto, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 377 days.

(21) Appl. No.: 10/500,969

(22) PCT Filed: Feb. 25, 2003

(86) PCT No.: PCT/JP03/02054

§ 371 (c)(1), (2), (4) Date: Jul. 8, 2004

(87) PCT Pub. No.: WO03/072913

PCT Pub. Date: Sep. 4, 2003

(65) Prior Publication Data

US 2004/0258582 A1    Dec. 23, 2004

(30) Foreign Application Priority Data

Feb. 26, 2002    (JP)  ............................. 2002-050087

(51) Int. Cl.
B01D 46/00    (2006.01)
(52) U.S. Cl. .................... 55/523; 55/DIG. 30; 422/177
(58) Field of Classification Search ................. 55/521, 55/523, 428.1, 467.1, 482.1, 483, 484, 485, 55/486, 487, 490.1, DIG. 30; 95/284, 273, 95/278; 210/269
See application file for complete search history.

(56) References Cited

U.S. PATENT DOCUMENTS

| | | | | |
|---|---|---|---|---|
| 3,853,485 A | * | 12/1974 | Hogan | ........................ 502/300 |
| 4,667,469 A | * | 5/1987 | Abthoff et al. | ................. 55/523 |
| 5,108,685 A | * | 4/1992 | Kragle | ................... 264/177.12 |
| 5,750,026 A | * | 5/1998 | Gadkaree et al. | .............. 55/523 |
| 5,853,444 A | * | 12/1998 | Maier et al. | ................... 55/523 |
| 7,056,365 B2 | * | 6/2006 | Ichikawa et al. | .............. 55/523 |
| 2003/0097834 A1 | * | 5/2003 | Gabe et al. | .................... 60/297 |
| 2004/0045267 A1 | * | 3/2004 | Ichikawa et al. | .............. 55/523 |
| 2004/0142145 A1 | * | 7/2004 | Hashimoto et al. | .......... 428/116 |
| 2005/0102984 A1 | * | 5/2005 | Bardon et al. | ................. 55/484 |

FOREIGN PATENT DOCUMENTS

| | | |
|---|---|---|
| EP | 1 142 619 A1 | 10/2001 |
| EP | 1 217 185 A2 | 6/2002 |

(Continued)

Primary Examiner—Duane Smith
Assistant Examiner—Robert Clemente
(74) Attorney, Agent, or Firm—Oliff & Berridge, PLC

(57) ABSTRACT

A honeycomb filter of the present invention is a honeycomb filter 10 including a number of through-holes 12 surrounded by partition walls and extending through an axial direction, in which the partition walls have filterability, predetermined through-holes 12 are plugged at one end portion, and the remaining through-holes 12 are plugged at the other end portion to trap particulate matter contained in a dust-containing fluid. The honeycomb filter is characterized in that a heat capacity of a central part 11 is set to be larger than that of a peripheral part 13 in a section of the honeycomb filter 10 perpendicular to the axial direction. There is provided a honeycomb filter in which a crack is not generated by thermal stress during use, especially at a regeneration time and which is superior in durability.

16 Claims, 4 Drawing Sheets

FOREIGN PATENT DOCUMENTS

| | | |
|---|---|---|
| EP | 1 384 507 A2 | 1/2004 |
| GB | 2 342 055 A | 4/2000 |
| GB | 2342055 A * | 4/2000 |
| JP | U 61-47420 | 3/1986 |
| JP | U 2-112919 | 9/1990 |
| JP | U 4-44420 | 4/1992 |
| JP | A 6-241017 | 8/1994 |
| JP | A 7-42534 | 2/1995 |
| JP | A 7-54643 | 2/1995 |
| JP | A 8-28246 | 1/1996 |
| JP | A 8-28248 | 1/1996 |
| JP | A 10-59784 | 3/1998 |
| JP | A 2001-241316 | 9/2001 |
| JP | A 2003-10616 | 1/2003 |
| WO | WO 97/24516 A1 | 7/1997 |
| WO | WO 9724516 A1 * | 7/1997 |
| WO | WO 01/53232 A1 | 7/2001 |
| WO | WO 0153232 A1 * | 7/2001 |

* cited by examiner

HONEYCOMB FILTER

TECHNICAL FIELD

The present invention relates to a honeycomb filter for trapping particulate matter contained in dust-containing fluid such as exhaust gas emitted from a diesel engine.

BACKGROUND ART

A honeycomb structure has heretofore been used as a filter for trapping particulate matter contained in a dust-containing fluid such as exhaust gas emitted from a diesel engine.

In the honeycomb structure used for such a purpose, the rapid temperature change of exhaust gas and the local heating easily makes non-uniform the temperature distribution inside the honeycomb structure, which makes problems such as crack generation in the honeycomb structure and the like. When the honeycomb structure is used particularly as a filter for trapping particulate matter in exhaust gas emitted from a diesel engine, it is necessary to burn the fine carbon particles deposited on the filter to remove the particles and regenerate the filter. In that case, high temperatures are inevitably generated locally in the filter. As a result, a large thermal stress and cracks tend to be generated. Here, the thermal stress is generated because thermal expansion/deformation of each part of the honeycomb structure differs by the non-uniformity of the temperature distribution, in which the temperature of a central part becomes higher than that of a peripheral part, and the parts are mutually restrained and are not freely deformable.

The above-described problem is remarkable especially in a honeycomb filter of SiC. That is, through the honeycomb filter of SiC is superior in heat resistance, the filter disadvantageously has a coefficient of thermal expansion which is higher than that of a conventionally-known cordierite honeycomb filter, and is inferior to the conventional filter in a thermal shock resistance.

To avoid this disadvantage, there has been known a measure of dividing structural parts into smaller segments to reduce the stress, and a proposal for applying this measure to the honeycomb structure for trapping particulates in the exhaust gas has been already described, for example, in JP-A-6-241017, JP-A-8-28246, JP-A-7-54643, and JP-A-8-28248.

However, since a thermal conductivity in a radial direction drops in the structure described in the above proposals, the thermal shock resistance is not much enhanced. Therefore, a stress reducing effect on the segment surface is insufficient, and the problem of crack generation cannot be completely solved.

The present invention has been developed in consideration of the conventional problems and aims to provide a honeycomb filter in which a crack is not generated by thermal stress generated at a use time, especially at a regeneration time and which is superior in durability.

DISCLOSURE OF THE PRESENT INVENTION

As the first aspect of the present invention, there is provided a honeycomb filter for trapping particulate matter contained in dust-containing fluid, the filter comprising a number of through-holes surrounded by partition walls and extending in an axial direction, the partition walls having filterability, predetermined through-holes being plugged at one end, remaining through-holes being plugged at the other end, wherein in a section of the honeycomb filter perpendicular to the axial direction, a heat capacity in a central part of the honeycomb filter is higher than that in a peripheral part of the honeycomb filter.

As the second aspect of the present invention, there is provided a honeycomb filter for trapping particulate matter contained in dust-containing fluid, the filter comprising a number of through-holes surrounded by partition walls and extending in an axial direction, the partition walls having filterability, predetermined through-holes being plugged at one end, remaining through-holes being plugged at the other end, wherein the honeycomb filter comprises an assembly of a plurality of honeycomb segments, and in a section of each honeycomb segment perpendicular to the axial direction, a heat capacity of a central part of the honeycomb filter is higher than that of a peripheral part of the honeycomb filter.

In the present invention, preferable embodiments in which a heat capacity of the central part of the honeycomb filter or the central part of each honeycomb segment is set to be higher than that of a peripheral part are as follows:

(1) a non-plugged through-hole end portion is plugged in the central part of the honeycomb filter or in the central part of the honeycomb segment in the end face of the honeycomb filter in the axial direction;

(2) a thickness of a partition wall in the central part of the honeycomb filter or in the central part of the honeycomb segment in the section perpendicular to the axial direction is set to be larger than that of the partition wall in the peripheral part;

(3) the thickness of the partition wall in the central part of the honeycomb segment is set to be 1.02 to 1.5 times that of the partition wall in the peripheral part of the honeycomb segment in the section of the honeycomb filter perpendicular to the axial direction;

(4) the thickness of the partition wall is gradually reduced toward the peripheral part from the central part with respect to some or all of the partition walls of the honeycomb segment in the section of the honeycomb filter perpendicular to the axial direction;

(5) a cell density in the central part of the honeycomb filter or in the central part of the honeycomb segment in the section perpendicular to the axial direction is set to be larger than that in the peripheral part of the filter or the segment;

(6) a bonding material of the honeycomb segment positioned in the central part of the honeycomb filter in the section perpendicular to the axial direction is set to be thicker than that of the honeycomb segment positioned in the peripheral part;

(7) a thermal conductivity of the honeycomb segment positioned in the central part of the honeycomb filter in the section perpendicular to the axial direction is set to be higher than that of the honeycomb segment positioned in the peripheral part; and (8) the plugging is performed in the honeycomb filter such that a plugging depth is large in the central part of the honeycomb filter or in the central part of the honeycomb segment, and small in the peripheral part of the filter or the segment, so that the heat capacity of the central part of the honeycomb filter is larger than that of the peripheral part.

As an area of the honeycomb segment positioned in the central part, a sectional area of the central part of the honeycomb segment is set to preferably 40 to 90% of that of the whole honeycomb segment in the section of the honeycomb filter perpendicular to the axial direction.

Moreover, a material for the honeycomb filter preferably contains one selected from the group consisting of SiC, $Si_3N_4$, alumina, mullite, aluminum titanate, zirconium phosphate, and lithium aluminum silicate as a main crystal phase, and especially SiC is preferable because its heat resistance is superior. The sectional shape of the through-holes of the honeycomb filter is preferably any of a triangle, a tetragon, a hexagon and a corrugated shape from the standpoint of production.

Furthermore, the honeycomb segment preferably carries a catalyst because the filter not only traps the particulate matter but also has a function of purifying the exhaust gas or the like is provided, and the catalyst further preferably contains at least one of Pt, Pd, Rh, K, Li, and Na.

BRIEF DESCRIPTION OF THE DRAWINGS

FIG. 8 are explanatory sectional views showing other embodiments of a honeycomb filter of the present invention.

BEST MODE FOR CARRYING OUT THE INVENTION

Figure 1:
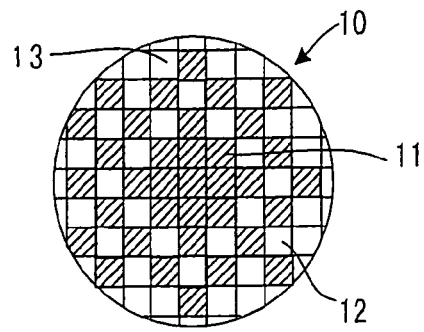
FIG. 1 is an explanatory view showing an end face of an embodiment of a honeycomb filter of the present invention.

In a honeycomb filter of the present invention, a section of the filter perpendicular to the axial direction is formed in such a manner that a heat capacity of a central part of the honeycomb filter is higher than that of a peripheral part or that a heat capacity of a central part of a honeycomb segment is higher than that of a peripheral part of the honeycomb segment. Accordingly, during use, especially at a regeneration time, a temperature rise in the central part whose temperature tends to rise more easily than in the peripheral part is suppressed, and a temperature difference between the central part and the peripheral part can be reduced. Therefore, cracks can be inhibited from being generated even by thermal stress caused in the honeycomb filter, and the filter is remarkably superior in durability.

The present invention will be described hereinafter in more detail based on embodiments. However, the present invention is not limited to these embodiments.

The present invention is a honeycomb filter for trapping particulate matter contained in a dust-containing fluid. The filter has a number of through-holes surrounded by partition walls and extending in an axial direction, the partition walls of the through-holes have filterability, predetermined through-holes are plugged at one end portion, and the remaining through-holes are plugged at the other end portion.

As a concrete method for setting the heat capacity of a central part of the honeycomb filter of the present invention constituted as described above or a central part of a honeycomb segment to be higher than that of a peripheral part, there are the following various embodiments. That is:

(1) a non-plugged through-hole end portion is plugged in the central part of the honeycomb filter or in the central part of the honeycomb segment in the end face of the honeycomb filter in the axial direction;

(2) a thickness of a partition wall in the central part of the honeycomb filter or in the central part of the honeycomb segment in the section perpendicular to the axial direction is set to be larger than that of the partition wall in the peripheral part;

(3) the thickness of the partition wall in the central part of the honeycomb segment is set to be 1.02 to 1.5 times that of the partition wall in the peripheral part of the honeycomb segment in the section of the honeycomb filter perpendicular to the axial direction;

(4) the thickness of the partition wall is gradually reduced toward the peripheral part from the central part with respect to some or all of the partition walls of the honeycomb segment in the section of the honeycomb filter perpendicular to the axial direction;

(5) a cell density in the central part of the honeycomb filter or in the central part of the honeycomb segment in the section perpendicular to the axial direction is set to be larger than that in the peripheral part of the filter or the segment;

(6) a bonding material of the honeycomb segment positioned in the central part of the honeycomb filter in the section perpendicular to the axial direction is set to be thicker than that of the honeycomb segment positioned in the peripheral part;

(7) a thermal conductivity of the honeycomb segment positioned in the central part of the honeycomb filter in the section perpendicular to the axial direction is set to be higher than that of the honeycomb segment positioned in the peripheral part; and (8) the plugging is performed in the honeycomb filter such that a plugging depth is large in the central part of the honeycomb filter or in the central part of the honeycomb segment, and small in the peripheral part of the filter or the segment, so that the heat capacity of the central part of the honeycomb filter is larger than that of the peripheral part.

The above-described embodiments will be concretely described hereinafter.

First, an embodiment of setting the heat capacity of the central part to be larger than that of the peripheral part in the honeycomb filter of the present invention can be largely classified into two. First, the honeycomb filter is constituted by a single body. Secondly, the honeycomb filter comprises a plurality of honeycomb segments, and the respective honeycomb segments are bonded via a bonding material to constitute the honeycomb filter.

When the honeycomb filter is constituted by a single body, as the first embodiment, the end portions of the through-holes which are not usually plugged are plugged in the central part of the end face of the honeycomb filter in the axial direction.

As shown in FIG. 1, in a central part 11 in the end face of a honeycomb filter 10 in the axial direction, the end portions of through-holes 12 are usually alternately plugged. However, in this case, the end portions of the through-holes 12 which are not usually plugged are further plugged. Accordingly, the heat capacity of the central part 11 can be set to be larger than that of a peripheral part 13.

Moreover, the object to set the heat capacity of the central part 11 to be larger than that of the peripheral part 13 can be achieved also when a plugging depth is increased in the central part 11 among the plugged end portions of the through-holes 12.

In the above-described constitution, since an amount of soot deposited in the central part 11 becomes smaller than that in the peripheral part, there is a merit that a temperature rise at a filter regeneration time (soot burning time) can be suppressed.

Here, defining that a certain region extending inwardly from an outer peripheral contour of the honeycomb filter (or the honeycomb segment) is the outer peripheral part, and a remaining region (further inner region) is the central part, an area range of the central part is set to 20 to 90% of that of a sectional area of the honeycomb filter (or the honeycomb segment). Examples of the region of the central part include a region surrounded by a shape analogous to a sectional shape of an outer peripheral surface centering on a center point on the section of the honeycomb filter (or the honeycomb segment), and a region surrounded by a circle centering on the center point. The area range of the central part is preferably 40 to 90%, further preferably 50 to 90% of the sectional area of the honeycomb filter (or the honeycomb segment).

As the second embodiment, for example, the thickness of the partition wall in the central part of the section of the honeycomb filter perpendicular to the axial direction is set to be larger than that of the partition wall in the peripheral part.

Figure 2:
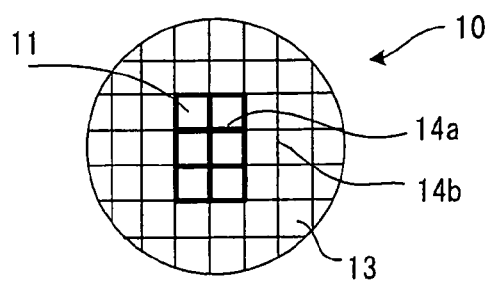
FIG. 2 is an explanatory view showing an end face of another embodiment of a honeycomb filter of the present invention.

As shown in FIG. 2, in the section of the honeycomb filter 10 perpendicular to the axial direction, the thickness of a partition wall 14a in the central part 11 is formed to be larger than that of a partition wall 14b in the peripheral part 13. Accordingly, the heat capacity of the central part 11 can be set to be higher than that of the peripheral part 13. Furthermore, in this constitution, resistance at a time when the exhaust gas passes through the partition wall in the central part of the honeycomb filter increases as compared with that in the peripheral part. Therefore, the amount of exhaust gas flowing through the central part of the honeycomb filter drops, and an amount of deposited particulate matter is also decreased. Therefore, the amount of heat generated in the central part of the honeycomb filter at the regeneration time relatively drops as compared with the outer peripheral part, temperature distribution of the honeycomb filter in a sectional direction is uniformalized, and a problem that the honeycomb filter is cracked at the regeneration time is solved.

Figure 3:
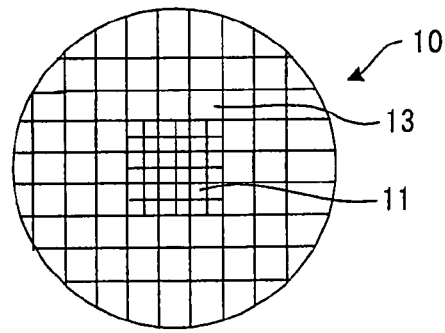
FIG. 3 is an explanatory view showing an end face of another embodiment of a honeycomb filter of the present invention.

In addition, as the third embodiment, as shown in FIG. 3, also when a cell density of the central part 11 is set to be larger than that of the peripheral part 13 in the section of the honeycomb filter 10 perpendicular to the axial direction, the heat capacity of the central part 11 can be set to be larger than that of the peripheral part 13 in the same manner as described above.

Next, the case where the honeycomb filter comprises a plurality of honeycomb segments and the respective honeycomb segments are bonded by the bonding material to constitute the honeycomb filter will be described.

In this manner, also when the plurality of honeycomb segments are bonded by the bonding material to constitute the honeycomb filter, the heat capacity of the filter central part can be set to be larger than that of the peripheral part by various embodiments as described below. Similarly, the heat capacity of the central part of each honeycomb segment can be set to be larger than that of the peripheral part.

Figure 4:
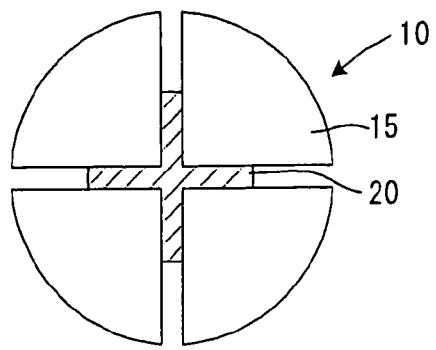
FIG. 4 is an explanatory sectional view showing another embodiment of a honeycomb filter of the present invention.

First, as shown in FIG. 4, honeycomb segments 15 are bonded to one another by a bonding material 20 only in the central part of the honeycomb filter 10.

Figure 5:
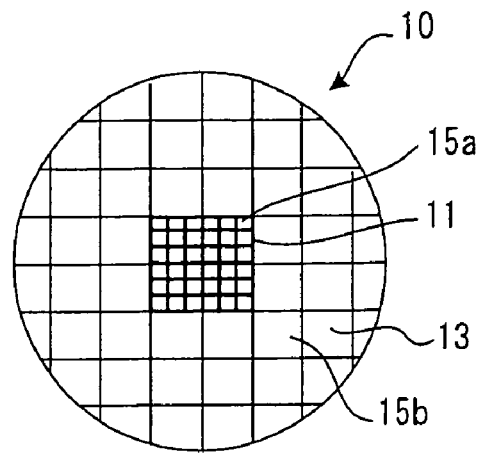
FIG. 5 is an explanatory sectional view showing another embodiment of a honeycomb filter of the present invention.

Moreover, as shown in FIG. 5, the thickness of the partition wall of a honeycomb segment 15a positioned in the central part 11 is set to be larger than that of the partition wall of a honeycomb segment 15b positioned in the peripheral part 13 in section of the honeycomb filter 10 perpendicular to the axial direction. In this constitution, in the same manner as in the case where the partition wall in the central part of the honeycomb filter is thickened, the amount of deposited particulate matter can be decreased. Therefore, the amount of heat generated in the central part of the honeycomb segment at the regeneration time relatively drops as compared with the outer peripheral part, and a problem that the honeycomb segment is cracked at the regeneration time is solved.

Figure 6:
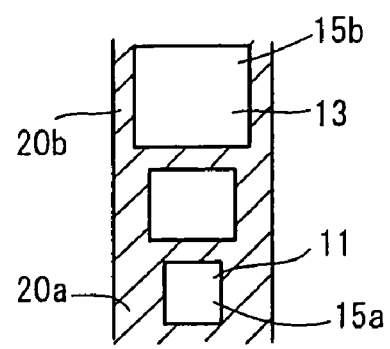
FIG. 6 is an explanatory partially sectional view showing another embodiment of a honeycomb filter of the present invention.

Furthermore, as shown in FIG. 6, in the section of the honeycomb filter perpendicular to the axial direction, a bonding material 20a for use in bonding the honeycomb segment 15a positioned in the central part 11 is formed to be thicker than a bonding material 20b for use in bonding the honeycomb segment 15b positioned in the peripheral part 13.

Additionally, in the section of the honeycomb filter perpendicular to the axial direction, the thermal conductivity of the honeycomb segment positioned in the central part is set to be larger than that of the honeycomb segment positioned in the peripheral part in a preferable embodiment.

Figure 7:
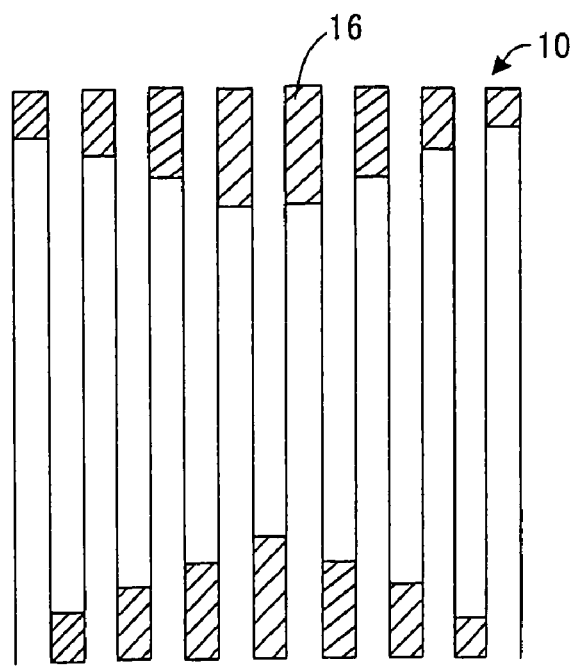
FIG. 7 is an explanatory sectional view showing another embodiment of a honeycomb filter of the present invention.

Furthermore, in both the honeycomb filter integrally constituted by a single body and the honeycomb filter comprising a plurality of honeycomb segments, as shown in FIG. 7, plugging portions 16 are formed such that the plugging depth is large in the central part and small in the peripheral part. Accordingly, the heat capacity of the central part of the honeycomb filter 10 becomes larger than that of the peripheral part. This may be said to be a preferable embodiment. In each honeycomb segment, the heat capacity of the central part is set to be larger than that of the peripheral part as another preferable embodiment.

Figure 8A:
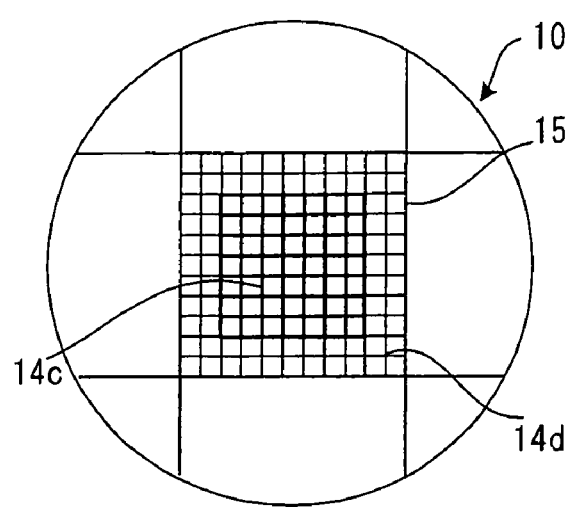
FIG. 8(a) shows a case where only a central part of a honeycomb segment has a thick partition wall.
Figure 8B:
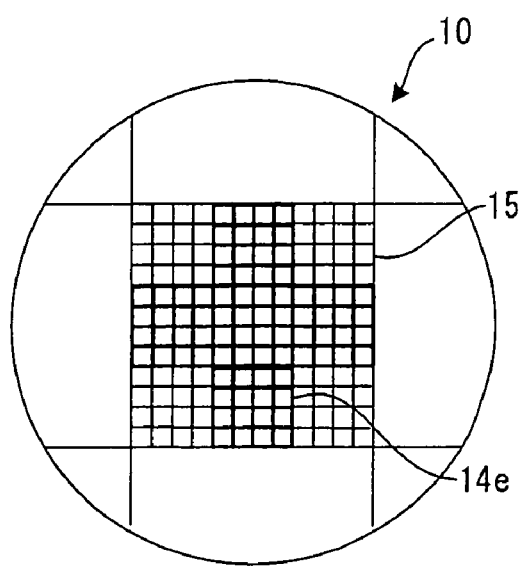
FIG. 8(b) shows a case where the partition wall of the honeycomb segment is formed in a thick cross shape.

Additionally, when the honeycomb filter comprises a plurality of honeycomb segments, as shown in FIG. 8(a), partition walls 14c in the central part of the honeycomb segment 15 is formed to be thicker than partition walls 14d in the peripheral part as another preferable embodiment. As shown in FIG. 8(b), partition walls 14e are formed to be thick in a cross form in each honeycomb segment 15 as still another preferable embodiment.

The thickness of the partition wall in the central part of the honeycomb segment is preferably 1.02 to 1.5 times that of the partition wall in the peripheral part of the honeycomb segment. When the wall is thick 1.5 times, a air flow resistance of the whole honeycomb filter tends to increase.

Figure 9:
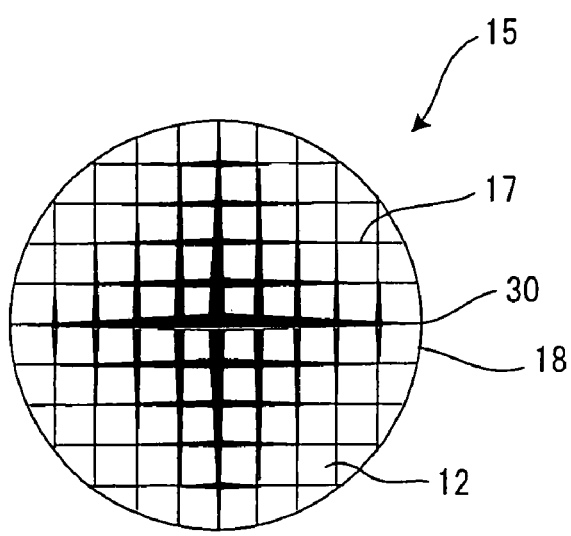
FIG. 9 is an explanatory sectional view showing another embodiment of a honeycomb filter of the present invention.

Moreover, as shown in FIG. 9, in some or all of partition walls 17 in the section of the honeycomb segment 15, the thickness may be gradually increased toward the inside from a position of a contact 30 of an outer peripheral wall 18. Furthermore, the thickness of the partition wall 17 partitioning each through-hole 12 may be successively increased toward the inside from the outside. Here, "being gradually increased" means that an average thickness of the partition wall 17 which partitions the through-hole 12 positioned in a peripheral side is increased. For example, the thickness may be continuously changed as shown in FIG. 9, or the thickness may also be changed for each partition wall 17 which partitions one through-hole 12.

The thickness of the partition wall of the honeycomb segment is in a range of preferably 50 to 2,000 μm. When the thickness of the partition wall is less than 50 μm, strength of the honeycomb segment becomes insufficient. When the thickness exceeds 2000 μm, effective geometric surface area (GSA) of the honeycomb segment drops, and a pressure loss increases when the gas flows.

In the present invention, the sectional area of the central part of the honeycomb segment is preferably 40 to 90%, further preferably 50 to 90% of that of the whole honeycomb segment in the section of the honeycomb filter perpendicular to the axial direction.

A sectional shape of the section of the honeycomb filter perpendicular to the through-hole in the present invention may be various shapes such as a circle, an ellipse, and a race track shape.

Moreover, in the honeycomb filter of the present invention, as described above, an embodiment in which two or more honeycomb segments are combined/constituted may be employed. A material for the filter preferably contains one selected from the group consisting of SiC, $Si_3N_4$, alumina, mullite, aluminum titanate, zirconium phosphate, and lithium aluminum silicate as a main crystal phase from standpoints of strength, thermal resistance or the like, and SiC having a high thermal conductivity is especially preferable in that heat is easily discharged.

The cell density of cells formed by the partition walls is preferably 6 to 2000 cells/square inch (0.9 to 311 cells/cm$^2$), further preferably 50 to 400 cells/square inch (7.8 to 62 cells/cm$^2$). When the cell density is less than 6 cells/square inch (0.9 cells/cm$^2$), the strength and effective geometric surface area (GSA) of the honeycomb segment become insufficient. When the density exceeds 2000 cells/square inch (311 cells/cm$^2$), the pressure loss increases when the gas flows.

There is no particular restriction as to the sectional shape of through-holes (cell shape). However, the sectional shape is preferably any of a triangle, a tetragon, a hexagon and a corrugated shape from the standpoint of production.

Moreover, as the bonding material for bonding the honeycomb segments and as the plugging material, a ceramic fiber, ceramic powder, or cement having heat resistance is preferably used alone, or they are mixed for use. Furthermore, if necessary, an organic binder, an inorganic binder or the like may also be mixed and used.

When a dust-containing fluid is passed from one end face of the honeycomb filter of the present invention, the dust-containing fluid flows into the honeycomb filter via the through-holes whose end portions on one end face side are not plugged. The fluid passes through porous partition walls having filterability, and enters the other through-holes that are not plugged on the side of the other end face of the honeycomb filter. The particulate matter in the dust-containing fluid is trapped by the partition walls when the fluid passes through the partition walls, and the purified fluid from which the particulate matter has been removed is discharged from the other end face of the honeycomb filter.

It is to be noted that when the trapped particulate matter is deposited on the partition wall, clogging occurs, and the function of the filter is deteriorated. Therefore, by periodically heated the honeycomb filter by a heating means such as a heater, the particulate matter is burnt/removed, and the filter function is regenerated. To promote the burning of the particulate matter at the regeneration time, a metal having catalytic activity may be loaded on the honeycomb filter.

It is preferred that the honeycomb filter of the present invention is loaded with a catalyst, for example, a metal having a catalytic activity when the present honeycomb filter is intended to use as a catalyst carrier for purifying exhaust gas emitted from a heat engine such as internal combustion engine or the like or from a burner such as boiler or the like, or for reforming liquid fuel or gaseous fuel. As a representative metal having a catalytic activity, Pt, Pd, Rh, K, Li and Na are mentioned, and it is preferred to load at least one kind of these on the honeycomb filter.

Next, methods of producing the honeycomb filter of the present invention will be described, but the method of producing the honeycomb filter of the present invention is not limited to these methods.

As a raw material powder for the honeycomb segment, the above-described preferable materials such as a silicon carbide powder are used. To the powder, binders such as methyl cellulose and hydroxypropoxyl methylcellulose are added. Further, a surface-active agent and water are added to prepare clay having plasticity. The clay is extruded to form honeycomb segments as shown, for example, in FIGS. 4, 5, 8(*a*), 8(*b*), and 9.

After drying the honeycomb segments, for example, with microwaves and hot air, the outer peripheral surface of the honeycomb segment is coated with the bonding material having the same composition as that of the clay, and the honeycomb segments are bonded, assembled, and dried. The obtained assembled dry body is heated/degreased, for example, in a nitrogen atmosphere, and subsequently heated in an inert atmosphere such as Ar atmosphere so that the honeycomb filter of the present invention can be obtained.

In the present invention, as a method of bonding the honeycomb segments, in addition to the method of directly applying the outer peripheral surface with the bonding material as described above, a plate formed by a bonding material in a predetermined thickness may be used, and a honeycomb segment may be bonded to another honeycomb segment by the plate and the bonding material.

After producing the honeycomb filter in the above-described method, the end face of the honeycomb filter can be plugged with a raw material similar to that of the honeycomb segment.

Catalyst may be loaded on the thus-produced honeycomb filter by a method ordinarily used by those skilled in the art, for example, by wash-coating a catalyst slurry on the honeycomb filter, and then conducting drying and firing.

EXAMPLES

The present invention is described in more detail below by way of Examples. However, the present invention is not restricted to these Examples.

Examples 1 to 8, Comparative Examples 1 to 4

Regeneration limit was evaluated using a honeycomb filter having material characteristics such as a porosity of 45%, an average pore diameter of 10 μm, and a thermal conductivity of 40 W/mK and comprising a honeycomb structure of SiC having a diameter of 5.66 inches and a length of 6 inches and having a plugging depth of 3 mm. In the evaluation of the regeneration limit, a predetermined amount of artificially produced soot was deposited on the honeycomb filter, and a high-temperature gas was introduced at 600° C., 2.3 Nm$^3$/min to regenerate the filter (burn the soot). Thereafter, a limit soot amount in which any crack was not generated was set to a regeneration limit. It is to be noted that a dimension of nine segments in Examples 4 to 7, Comparative Examples 2, 4 was basically 58 mm, and an outer peripheral segment was worked in a predetermined outer dimension in accordance with a product outer shape.

The results are shown in Table 1.

Figure 10:
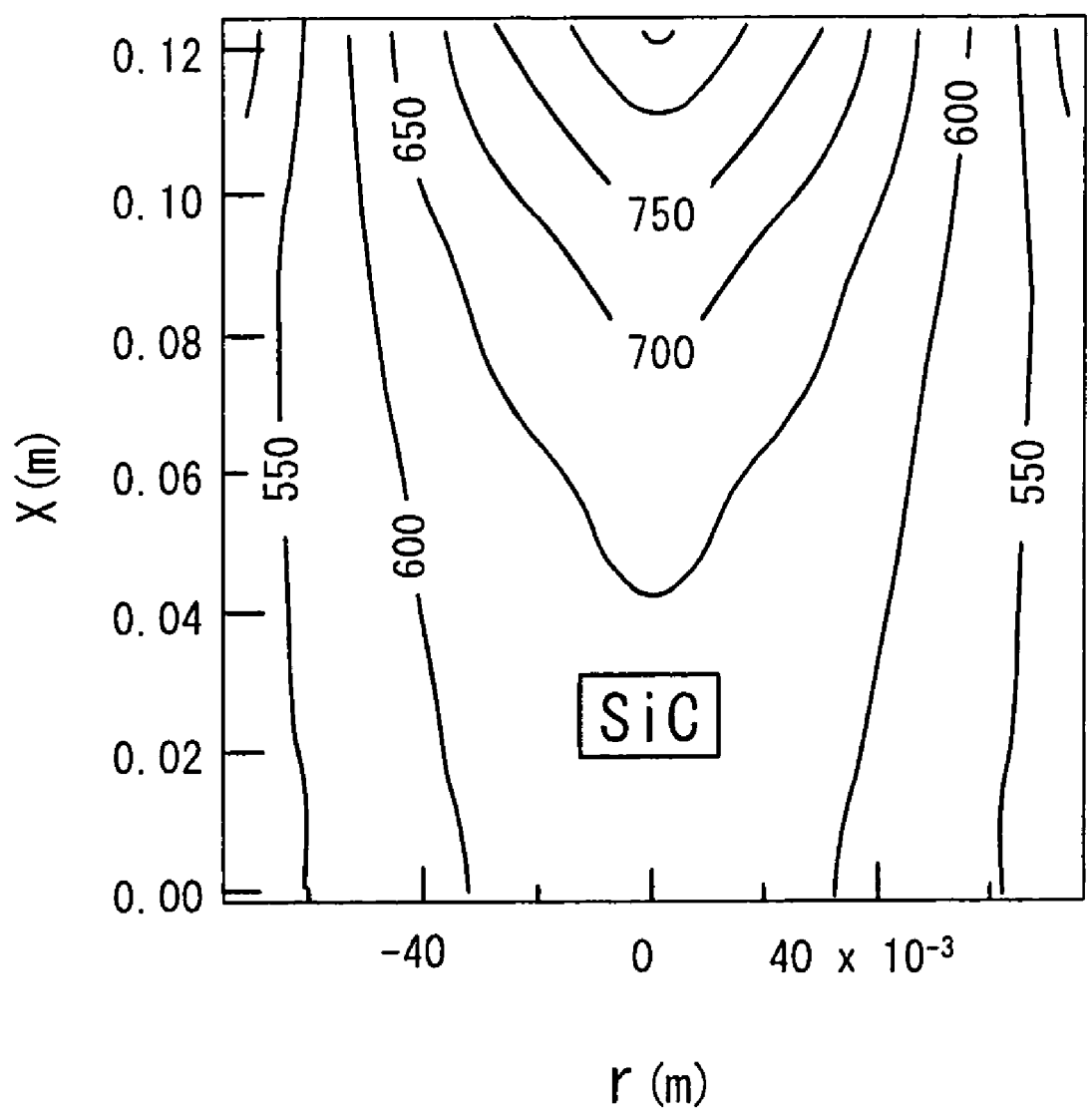
FIG. 10 is a graph showing temperature distribution on a honeycomb filter in regeneration.

Moreover, in the honeycomb filter described in Example 1, the amount of deposited soot was 10 g/L, and a high-temperature gas having an $O_2$ concentration of 10% was introduced at 600° C., 0.7 $Nm^3$/min to regenerate/burn the honeycomb filter. The results of measurement of a temperature distribution at the regeneration time in this case are shown in FIG. 10. In FIG. 10, r(m) denotes a length in a radial direction, X(m) denotes a length in an axial direction, lines shown in a graph are isothermal lines indicating a temperature distribution, and numeric values indicate temperatures of the isothermal lines (unit:° C.).

TABLE 1

| SiC material Example, Comparative Example | Cell structure mil/cpi | Additional structure | Regeneration limit (g/L) |
|---|---|---|---|
| Example 1 | 12/200 | Central part additional plugged 100 cells | 18 |
| Example 2 | 12/200 | Wall thickness of central part 15 mil, radial direction 50% length region | 20 |
| Example 3 | 12/200 | Central part 350 cpi, radial direction 50% length region | 18 |
| Example 4 | 12/200 | 9 segments, bonding thickness 3 mm, segment central part in cross form, 7 cells added in width, 15/200 structure, cell thickness increase | 20 |
| Example 5 | 12/200 | 9 segments, central segments 14/200, bonding thickness 3 mm | 20 |
| Example 6 | 12/200 | 9 segments, central segment peripheral bonding thickness 5 mm, another bonded portion 1 mm | 18 |
| Example 7 | 12/200 | 9 segments, central part segment thermal conductivity 1.5 times, bonding thickness 1 mm | 16 |
| Example 8 | 12/200 | Central part plugging depth 30 mm, peripheral part 3 mm, depth distribution proportional to distance from center | 18 |
| Comparative Example 1 | 12/200 | Plugging depth 3 mm | 12 |
| Comparative Example 2 | 12/200 | 9 segments, uniform bonding thickness 1 mm | 10 |
| Comparative Example 3 | 15/200 | Plugging depth 3 mm | 12 |
| Comparative Example 4 | 14/200 | 9 segments, uniform bonding thickness 3 mm | 8 |

Examples 9 to 16, Comparative Examples 5 to 8

The regeneration limit was evaluated with respect to honeycomb filters which were the same as those of Examples 1 to 8 and Comparative Examples 1 to 4 except for different cell structures. The results are shown in Table 2.

TABLE 2

| SiC material Example, Comparative Example | Cell structure mil/cpi | Additional structure | Regeneration limit (g/L) |
|---|---|---|---|
| Example 9 | 12/300 | Central part additional plugged 150 cells | 20 |
| Example 10 | 12/300 | Wall thickness of central part 15 mil, radial direction 50% length region | 22 |
| Example 11 | 12/300 | Central part 350 cpi, radial direction 50% length region | 16 |
| Example 12 | 12/300 | 9 segments, bonding thickness 3 mm, segment central part in cross shape, 7 cells in width, 15/200 structure, cell thickness increase | 20 |
| Example 13 | 12/300 | 9 segments, central segment 14/200, bonding thickness 3 mm | 18 |
| Example 14 | 12/300 | 9 segments, central segment peripheral bonding thickness 5 mm, other bonded portion 1 mm | 16 |
| Example 15 | 12/300 | 9 segments, central part segment thermal conductivity 1.5 times, bonding thickness 1 mm | 18 |
| Example 16 | 12/300 | Central part plugging depth 30 mm, peripheral part 3 mm, depth distribution proportional to distance from center | 20 |
| Comparative Example 5 | 12/300 | Plugging depth 3 mm | 12 |
| Comparative Example 6 | 12/300 | 9 segments, uniform bonding thickness 1 mm | 12 |
| Comparative Example 7 | 15/300 | Plugging depth 3 mm | 10 |
| Comparative Example 8 | 14/300 | 9 segments, uniform bonding thickness 3 mm | 10 |

Examples 17 to 18, Comparative Examples 10 to 11

The regeneration limit was evaluated with respect to honeycomb filters which were the same as those of Examples 1 to 8, Comparative Examples 1 to 4 except that cordierite was used as the material, cell structures with 12 mil/200 cpi, 12 mil/300 cpi were used, and the cell thickness of the honeycomb segment central part was increased to 15 mil. The results are shown in Table 3.

Examples 19 to 25, Comparative Examples 12 to 13

SiC was used as a material, 12 mil/200 cpi, 12 mil/300 cpi were used as a cell structure, the cell thickness was increased in a predetermined area portion in the central part of a honeycomb segment as shown in FIG. 8(*a*), and regeneration limits of Examples 19 to 25 were evaluated. The results of the evaluation of a uniform thickness are shown in Comparative Examples 12, 13.

TABLE 3

| Cordierite & SiC material Example, Comparative Example | Cell structure mil/cpi | Additional structure | Regeneration limit (g/L) |
|---|---|---|---|
| Example 17 | 12/200 | 9 segments, uniform bonding thickness 1 mm, segment central part 5 cell square 15/200 | 16 |

TABLE 3-continued

| Cordierite & SiC material Example, Comparative Example | Cell structure mil/cpi | Additional structure | Regeneration limit (g/L) |
|---|---|---|---|
| Example 18 | 12/300 | 9 segments, uniform bonding thickness 1 mm, segment central part 5 cell square 15/300 | 16 |
| Comparative Example 10 | 12/200 | 9 segments, uniform bonding thickness 1 mm | 8 |
| Comparative Example 11 | 12/300 | 9 segments, uniform bonding thickness 1 mm | 10 |
| Example 19 | 12/300 | 9 segments, uniform bonding thickness 1 mm, central part wall thickness 2% increase, central part area 90% | 20 |
| Example 20 | 12/300 | 9 segments, uniform bonding thickness 1 mm, central part wall thickness 5% increase, central part area 90% | 22 |
| Example 21 | 12/300 | 9 segments, uniform bonding thickness 1 mm, central part wall thickness 5% increase, central part area 80% | 20 |
| Example 22 | 12/300 | 9 segments, uniform bonding thickness 1 mm, central part wall thickness 50% increase, central part area 70% | 18 |
| Example 23 | 12/300 | 9 segments, uniform bonding thickness 1 mm, central part wall thickness 2% increase, central part area 70% | 18 |
| Example 24 | 15/200 | 9 segments, uniform bonding thickness 1 mm, central part wall thickness 2% increase, central part area 90% | 20 |
| Example 25 | 15/200 | 9 segments, uniform bonding thickness 1 mm, central part wall thickness 5% increase, central part area 80% | 20 |
| Comparative Example 12 | 12/300 | 9 segments, uniform bonding thickness 1 mm | 12 |
| Comparative Example 13 | 15/200 | 9 segments, uniform bonding thickness 1 mm | 12 |

INDUSTRIAL APPLICABILITY

As described above, according to a honeycomb filter of the present invention, during use, especially at a regeneration time, a temperature rise is suppressed in a central part of the honeycomb filter or a central part of each honeycomb segment whose temperature tends to rise as compared with a peripheral part. A temperature difference between the central part and the peripheral part of honeycomb filter or between the central part and the peripheral part of each honeycomb segment is reduced, and a thermal stress generated in the honeycomb filter can be reduced. As a result, any crack can be inhibited from being generated in the honeycomb filter, and the filter has a superior effect that durability is remarkably superior.

The invention claimed is:

1. A honeycomb filter for trapping particulate matter contained in dust-containing fluid, the filter comprising:
a number of through-holes surrounded by partition walls and extending in an axial direction,
the partition walls having filterability, predetermined through-holes being plugged at one end, remaining through-holes being plugged at the other end,
wherein in a section of the honeycomb filter perpendicular to the axial direction, heat capacity in a central part of the honeycomb filter is higher than that in a peripheral part of the honeycomb filter,
wherein in the section of the honeycomb filter perpendicular to the axial direction, a thickness of the partition wall in the central part is set to be larger than that of the partition wall in the peripheral part.

2. The honeycomb filter according to claim 1, wherein in an end face of the honeycomb filter in the axial direction, a non-plugged through-hole end portion is plugged in the central part of the honeycomb filter.

3. The honeycomb filter according to claim 1, wherein in the section of the honeycomb filter perpendicular to the axial direction, a cell density in the central part is set to be larger than that in the peripheral part.

4. The honeycomb filter according to claim 1, wherein the plugging is performed in the honeycomb filter such that a plugging depth is large in the central part, and small in the peripheral part, so that a heat capacity in the central part of the honeycomb filter is set to be larger than that in the peripheral part.

5. A honeycomb filter for trapping particulate matter contained in dust-containing fluid, the filter comprising:
a number of through-holes surrounded by partition walls and extending in an axial direction,
the partition walls having filterability,
predetermined through-holes being plugged at one end, remaining through-holes being plugged at the other end,
wherein the honeycomb filter comprises an assembly of a plurality of honeycomb segments, and
in a section of each honeycomb segment perpendicular to the axial direction, a heat capacity of a central part of the honeycomb filter is higher than that of a peripheral part of the honeycomb filter, and
in a section of the honeycomb filter perpendicular to the axial direction, a thickness of the partition wall of the honeycomb segment positioned in a central part of the honeycomb filter is set to be larger than that of the partition wall of the honeycomb segment positioned in a peripheral part.

6. The honeycomb filter according to claim 5, wherein the honeycomb filter comprises a plurality of the honeycomb segments bonded by a bonding material.

7. The honeycomb filter according to claim 6, wherein the thickness of the partition wall in the central part of the honeycomb segment is set to 1.02 to 1.5 times that of the partition wall in the peripheral part of the honeycomb segment.

8. The honeycomb filter according to claim 5, wherein in the section of the honeycomb filter perpendicular to the axial direction, a sectional area of the central part of the honeycomb segment is set to 90% or less of that of the whole honeycomb segment.

9. The honeycomb filter according to claim 6, wherein in the section of the honeycomb filter perpendicular to the axial direction, the thickness of the partition wall is gradually reduced toward the peripheral part from the central part with respect to some or all of the partition walls of the honeycomb segment.

10. The honeycomb filter according to claim 5, wherein the honeycomb filter comprises a plurality of the honeycomb segments bonded by a bonding material, and
in the section of the honeycomb filter perpendicular to the axial direction, the bonding material of the honeycomb segment positioned in a central part of the honeycomb filter is formed to be thicker than that of the honeycomb segment positioned in a peripheral part.

11. The honeycomb filter according to claim 5, wherein the honeycomb filter comprises a plurality of the honeycomb segments bonded by a bonding material, and in the section of the honeycomb filter perpendicular to the axial direction, a thermal conductivity of the honeycomb segment positioned in the central part of the honeycomb filter is higher than that of the honeycomb segment positioned in the peripheral part.

12. The honeycomb filter according to claim 5, wherein the plugging is performed in the honeycomb segment constituting the honeycomb filter such that a plugging depth is large in the central part of the honeycomb segment, and small in the peripheral part, so that a heat capacity of the central part of the honeycomb filter is set to be larger than that of the peripheral part.

13. The honeycomb filter according to claim 1, wherein a material of the filter contains one selected from the group consisting of SiC, $Si_3N_4$, alumina, mullite, aluminum titanate, zirconium phosphate, and lithium aluminum silicate as a main crystal phase.

14. The honeycomb filter according to claim 1, wherein a sectional shape of the through-hole is any of a triangle, a tetragon, a hexagon and a corrugated shape.

15. The honeycomb filter according to claim 5, wherein the honeycomb segment carries a catalyst.

16. The honeycomb filter according to claim 15, wherein the catalyst contains at least one selected from the group consisting of Pt, Pd, Rh, K, Li, and Na.

* * * * *